(12) United States Patent
Mazzoleni et al.

(10) Patent No.: US 6,387,436 B1
(45) Date of Patent: May 14, 2002

(54) GRANOLA-TYPE FOOD PRODUCT AND METHOD

(75) Inventors: Julie Mazzoleni, Arlington Heights; Michael Rapp, Schaumburg, both of IL (US)

(73) Assignee: The Quaker Oats Company, Chicago, IL (US)

( * ) Notice: Subject to any disclaimer, the term of this patent is extended or adjusted under 35 U.S.C. 154(b) by 0 days.

(21) Appl. No.: 09/539,829

(22) Filed: Mar. 31, 2000

(51) Int. Cl.$^7$ .............................................. A23L 1/164
(52) U.S. Cl. .................. 426/618; 426/551; 426/554; 426/564; 426/619; 426/620; 426/621; 426/639
(58) Field of Search ................................ 426/618, 619, 426/620, 621, 639, 564, 551, 554

(56) References Cited

U.S. PATENT DOCUMENTS

| | | | |
|---|---|---|---|
| 4,451,488 A | 5/1984 | Cook et al. | 426/89 |
| 4,689,238 A | * 8/1987 | Hitchner | 426/571 |
| 5,894,027 A | 4/1999 | Kazemzadeh | 426/94 |

* cited by examiner

Primary Examiner—Helen Pratt
(74) Attorney, Agent, or Firm—Ryndak & Suri

(57) ABSTRACT

A grain product is provided that contains flaked grains stabilized in a solid foam matrix that contains no added fat and cohesively binds together the flaked grains. The solid foam matrix has an expanded volume formed by introduction of a gas, which may be formed in situ by evolution of a gas upon reaction of at least one gas-releasing compound with at least one material selected from the group consisting of an acid or an acidic salt when the foam matrix materials are in a fluid state. Preferably, the gas-releasing compound is a leavening agent or virtually any chemical compound that, by reaction with another compound, results in the evolution of a gas in a sufficient amount to form the desired liquid foam that can be dried or cured to form a solid foam matrix. The flaked grain product typically having a density in the range of from about 22 lb/ft$^3$ to about 31 lb/ft$^3$. In this embodiment of the invention, the grain product comprises flaked grain or grains bound together in a solid foam matrix which binds together the flaked grain or grains. The method can include reacting a gas-releasing compound with at least one material selected from the group consisting of an acid and a salt of an acid, resulting in the evolution of a gas to form a fluid foam that can be dried or curved to form a solid foam matrix. Additionally, a method is provided for making the inventive granola-type product. The method includes mixing flaked grain with a fluid foam or foamable mixture. The mixture of fluid foam and flaked grain is then dried or cured to form the product composed of flaked grain bound in a solid foam matrix.

21 Claims, 1 Drawing Sheet

GRANOLA-TYPE FOOD PRODUCT AND METHOD

FIELD OF THE INVENTION

This invention relates to granola-type products and methods of making such products. More particularly, the present invention relates to a granola-type product comprising rolled grain flakes bound together with a solid foam matrix, which can be made without added fat. The foam matrix imparts a palatable, firm, chewy texture and a reduced density to the granola-type product. The invention also relates to a method of making a granola-type product composed of a solid foam binder.

BACKGROUND OF THE INVENTION

Popularized in the 1970s, granola is a cereal-based product that tends to have a relatively hard texture as a result of the baking process used in its production. Cereal manufacturers have found that the inclusion of fat—at a typical concentration of at least about three to seven grams of fat per about 55 grams of finished product—imparts tenderness to the product. However, as a result of the added fat, granola typically has a relatively high fat content and a high density in the range of about 27 $lb/ft^3$ to about 35 $lb/ft^3$.

Aside from the textural issue, another problem facing cereal manufacturers is the tendency of the coating material to chip or fall off the baked granola product and settle at the bottom of the package. This makes it virtually impossible to obtain a uniform bulk-packaged granola product.

Thus, there exists a need for a granola-type product comprising flaked grain and having a palatable and tender, yet crisp, texture and a reduced density relative to traditional granola products. There also exists a need for a granola-type product having a binding matrix that contributes no added fat to the finished product. Additionally, there exists a need for a granola-type product having a coating that adheres to the flaked grain without chipping or falling off. Further, there exists a need for a method for making the afore-described binding matrix and the granola-type product.

SUMMARY OF THE INVENTION

In accordance with one aspect of the present invention, a granola-type grain product is provided that has no added fat and comprises flaked grain bound together in a solid foam binder matrix. The solid foam binder matrix comprises at least one sugar and at least one material selected from the group consisting of protein constituents, malt, acidulants, and flavors. The binder matrix, in combination with the flaked grain, forms a unitary mass in which the flaked grain is cohesively bound together. In one embodiment, the binder matrix has an expanded volume (i.e., a solid foam) resulting from the evolution of a gas in situ upon reaction of at least one gas-releasing compound, such as a leavening agent, with at least one of an acid or a salt of an acid when the foam binder matrix materials are in a fluid state. The solid foam matrix also typically contains the reaction products of the gas-producing reaction, which may be a salt formed upon such evolution of gas. Typically, the gas-releasing compound is a leavening agent. However, the gas-releasing compound is not limited to such materials, and may be any suitable compound that, by reaction with another compound, results in the evolution of a gas in a manner which results in the formation of a foam that can be dried or cured to form a solid foam matrix.

The term "granola-type product" means a product composed of a flaked grain or grains bound together in a solid matrix that forms a unitary mass of desired size with the flaked grain or grains. In accordance with the invention, the solid matrix is a solid foam in the finished product.

In accordance with another aspect of the present invention, a flaked grain product is provided that typically has a density in the range of from about 22 $lb/ft^3$ to about 31 $lb/ft^3$ and comprises flaked grain bound in a solid foam matrix. In this embodiment of the invention, the solid foam matrix cohesively binds together the flaked grain in a unitary solid mass that binds together the flaked grain. The solid foam matrix comprises at least one sugar and at least one material selected from the group consisting of protein constituents, malt, acidulants, and flavors. The foam matrix has an expanded volume which can be achieved by the evolution of a gas upon reaction of at least one gas-releasing compound with at least one material selected from the group consisting of an acid and a salt of an acid, with the evolution of the gas being accompanied by the formation of a salt which remains in the foam matrix. Typically, the gas-releasing compound is a leavening agent; however, virtually any compound that, by reaction with another compound, results in the evolution of a gas may be used. Giving the foam matrix its expanded volume are numerous miniscule cells within the foam matrix, which cells contribute to the reduced density of the finished grain product and impart a light texture.

In accordance with another aspect of the present invention, a method is provided for making the inventive product that includes a solid foam binder for application onto the flaked grain. The method comprises: (i) mixing at least one sugar with at least one material selected from the group consisting of protein constituents, malt, acidulants, and flavors to form a foam binder slurry or fluid that contains sufficient water to form such slurry or fluid; (ii) introducing into the foam binder slurry at least one gas-releasing compound for reacting with at least one material in the binder slurry or fluid, where such introduction forms a coating slurry, or otherwise introducing a gas into the mixture; and (iii) allowing the at least one gas-releasing compound to react with the at least one material to result in the evolution of a gas to foam the mixture, or using the introduced gas to foam the mixture. Optionally, the binder slurry or fluid may be heated at an elevated temperature—for example, from about 100° F. to 185° F., and, depending on the composition, preferably from about 120° F. to about 170° F.—to promote formation of the foam.

In accordance with still another aspect of the present invention, a method of making the inventive granola-type product is provided. The method involves (i) providing a stream of dry ingredients comprising flaked grain which includes at least one grain selected from the group consisting of, for example, oat, wheat, barley, rye, triticale, and other suitable grains; (ii) preparing a fluid foam binder as described above; (iii) applying the fluid foam binder to the dry ingredients to form a mass composed of flaked grain and fluid foam binder; and (iv) curing or drying the mass of flaked grain and fluid foam binder to form the grain product composed of flaked grain bound in a solid foam matrix where the product typically has a density in the range of from about 22 $lb/ft^3$ to about 31 $lb/ft^3$. Drying is a process that eliminates sufficient water from the foam to result in a solid foam mass.

In an alternative embodiment, a method of making the granola-type product is provided. The method includes forming a fluid mixture of foam binder materials comprising at least one sugar and at least one material selected from the group consisting of protein constituents, malt, acidulants, and flavors; mixing the fluid foam binder materials with flaked grain to form a mass composed of flaked grain and the fluid foam binder materials; forming a fluid foam binder from the foam binder materials; and curing the fluid foam binder to form a solid foam binder having the flaked grain bound therein in a unitary mass. The flaked grain granola-type product has a density in the range of from about 22 lb/ft$^3$ to about 31 lb/ft$^3$.

Products in accordance with the invention can be utilized as a hot cereal (with added milk or water and heat), a ready-to-eat cold cereal (with the addition of milk), or a snack (i.e., consumed directly from the container without further preparation).

Other advantages and features of the invention will become apparent from the following description and from reference to the drawings.

DETAILED DESCRIPTION OF THE INVENTION

Figure 1:
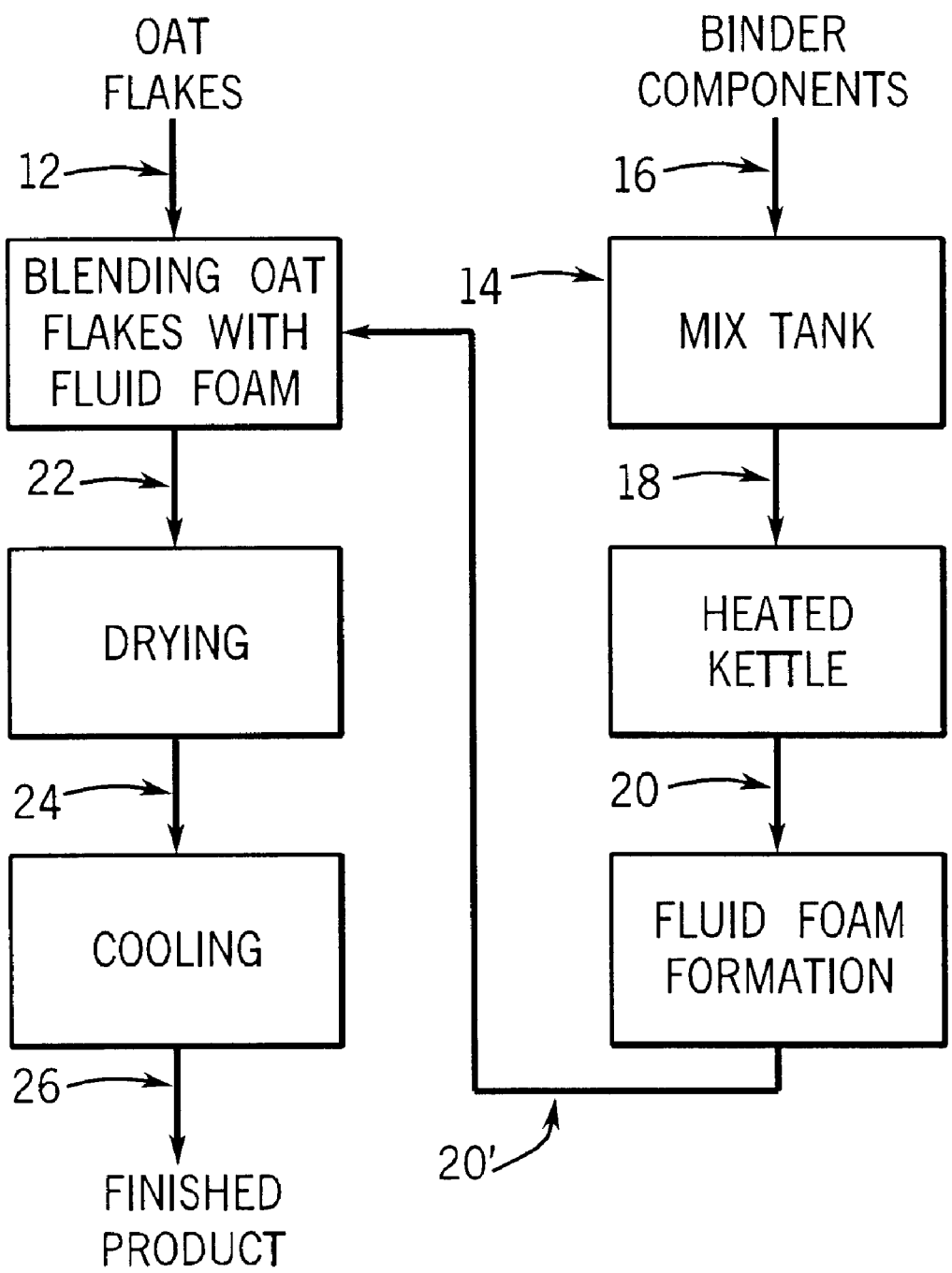
FIG. 1 is a flow chart illustrating a method of making the flaked grain granola-type product in accordance with the invention.

This invention includes all alternatives, modifications, and equivalents that may be encompassed within the spirit and scope of the invention, as defined by the appended claims. The invention is not limited to the embodiments described herein.

In accordance with the invention, any suitable flaked grain can be used, such as flaked oats, wheat, barley, rye, and triticale and any suitable method can be used to make the flaked grain including, for example, any suitable processing or cooking or partial processing technique. Oat flakes, wheat flakes, barley flakes, rye flakes, and triticale flakes can be obtained from their respective whole grain in any manner known to those skilled in the art and in any desired size range. Throughout the following description, like numerals and letters refer to like parts or steps.

In accordance with the present invention, a grain product is provided that has no added fat and comprises flaked grain bound in a solid foam matrix. The solid matrix binds together the flaked grain in a unitary mass. The foam matrix has an expanded volume resulting from the production of a gas in-situ upon reaction of at least one gas-releasing compound with at least one material selected from the acidulants consisting of an acid or a salt of an acid when the foam matrix materials are in a fluid state, or from the introduction of a gas into the fluid binder components. The reaction products, which may be a salt produced in the same reaction, may also become incorporated in the matrix. The gas is evolved in an amount sufficient to effect the formation of numerous bubbles of gas or air captured within the fluid foam.

The foam matrix comprises at least one sugar and at least one material selected from the group consisting of protein constituents, malt, acidulants, and flavors. The foam matrix, when cured or solidified (dried, for example), is relatively rigid and does not readily chip or fall off the flaked grain and is therefore particularly suited for packaging in bulk.

In general, the foam matrix typically accounts for from about 27% to about 50% by weight, on a dry weight basis, of the flaked grain product. More preferably, the foam matrix accounts for from about 32% to about 38% by weight, on a dry weight basis, of the finished flaked grain product. Most preferably, the foam matrix accounts for from about 35.5% to about 36.5% by weight, on a dry weight basis, of the finished flaked grain product.

The at least one sugar may be any suitable type of sugar, whether material or synthetic and is generally selected from the group consisting of sucrose, dextrose, fructose, cane sugar, beet sugar, molasses, invert sugar, honey, corn syrup, and mixtures thereof.

Generally, the liquid foam should contain sufficient water to achieve the desired liquid characteristics.

The protein constituent is selected from the group consisting of, for example, powdered milk, nonfat dry milk, evaporated milk, condensed milk, whey, dried yogurt, sodium caseinate, zein, and soy derivatives such as soy concentrates, soy isolates, and soy flour, for example.

The malt is selected from the group consisting of dried malt and malt extract, for example. The flavor is any suitable flavoring material such as, for example, natural and synthetic flavoring materials and spices.

The at least one gas-producing or gas-releasing compound is generally any compound that, by reaction with a different compound—typically an acid or a salt of an acid—results in the evolution of a gas. Generally, the at least one gas-producing compound is selected from the group consisting of carbonates, phosphates, sulfates, tartrates, citrates, glucono delta-lactone, and mixtures thereof. Preferably, the at least one gas-producing compound is a leavening agent selected from the group consisting of ammonium carbonate, ammonium bicarbonate, potassium carbonate, sodium bicarbonate, potassium bicarbonate, aluminum biphosphate, sodium aluminum phosphate, acidic calcium pyrophosphate blends, monocalcium phosphate monohydrate, anhydrous monocalcium phosphate, dicalcium phosphate dihydrate, sodium aluminum phosphate acidic, ammonium carbonate, ammonium bicarbonate, ammonium carbamate, calcium carbonate, monoammonium phosphate, diammonium phosphate, sodium acid pyrophosphate, aluminum sulfate, sodium aluminum sulfate, acidic potassium tartrate, glucono delta-lactone and mixtures thereof. Most preferably, the gas-producing compound is sodium bicarbonate.

In the preparation of the fluid or uncured foam matrix, the gas-releasing compound is used at an amount effective to produce a sufficient quantity of gas so as to attain an enhanced volume in the matrix and to impart a chewy, palatable texture in the finished grain product. Typically, the gas-producing compound accounts for from about 0.35% to about 2.75% by total wet weight of the fluid foam.

The material that reacts with the gas-producing compound is typically an acidulant—i.e., an acid or a salt of an acid—and is generally selected from the group consisting of, for example, citric acid, tartaric acid, ortho-phosphoric acid, and pyrophosphoric acid and their respective calcium, sodium, and potassium salts; fumaric acid; lactic acid; calcium lactate; calcium sulfate; and cream of tartar.

Alternatively, the fluid binder components may be foamed by the introduction of a gas in a suitable manner to create a fluid foam matrix, such as by whipping or blending air or some other gas into fluid, which may be unfoamed fluid or partially foamed binder components. In this particular embodiment, the fluid binder components need not include a gas-producing compound.

The foam matrix may additionally contain other ingredients such as maltodextrin, corn syrup solids, nutrients, colorants, salt, and lecithin, for example.

In accordance with the invention, the inventive granola-type product may comprise an agglomeration of grain flakes ranging in size, from "small" agglomerates that have from 2 to 25 grain flakes bound within the foam matrix, and more typically from 10 to 25 grain flakes, to "large" agglomerates that generally have more than 25 grain flakes and, more typically, from 50 to more than 100 grain flakes. The agglomerated flake clusters preferably have a "natural," nonuniform appearance as if they have been broken into pieces. In an alternative embodiment, the clusters may have a more uniform "cut" appearance, or may be formed or cut into blocks, bars or portions of a desired shape and size.

In accordance with another aspect of the present invention, a flaked grain granola-type product is provided that has a density in the range of from about 22 lb/ft$^3$ to about 31 lb/ft$^3$ and comprises flaked grain bound in a foam matrix. In this embodiment, the solid matrix foam binds the flaked grains together. The solid foam matrix is disposed on at least a portion of the surfaces of the flaked grain and can be within at least a portion of the interstices that are formed between the flaked grain. The matrix foam is composed of materials as previously described. A substantially uniform distribution of foam throughout the product can ensure a uniform distribution of ingredients therethrough.

Typically, the foam matrix may account for about 27% to about 50%, on a dry weight basis, of the flaked grain product. More preferably, the foam matrix accounts for from about 32% to about 38% by weight, and most preferably, from about 35.5% to about 36.5% by weight on a dry weight basis of the finished flaked grain product.

The solid foam matrix has an expanded volume composed of cells that result from the introduction or evolution of a gas upon reaction of at least one gas-producing or gas-releasing chemical compound with at least one other material used in the preparation of the matrix. A salt, which may also be formed during the gas-evolving reaction, is incorporated into the matrix. The solid foam matrix has an expanded volume and reduced density that results during the evolution or introduction of a gas to form a foam that becomes stabilized by curing or drying the fluid foam. Distributed throughout the foam matrix are cells that can have a variety of shapes, configurations, and sizes, though generally they are of a size that is less than about 0.5 millimeters and preferably less than 0.25 millimeters. The cells confer a number of advantages to the finished product, including: (1) they contribute to the reduced density of the grain product, and (2) they impart a light texture to the product.

The gas-producing compound can be a compound that results in the evolution of a gas upon reaction with another compound. Typically, the gas-producing compound is selected from the group consisting of carbonates, phosphates, sulfates, tartrates, citrates, and glucono delta-lactone. Preferably, however, the gas-releasing compound is a leavening agent selected from the group consisting of ammonium carbonate, ammonium bicarbonate, potassium carbonate, sodium bicarbonate, potassium bicarbonate, aluminum biphosphate, sodium aluminum phosphate, acidic calcium pyrophosphate blends, monocalcium phosphate monohydrate, anhydrous monocalcium phosphate, dicalcium phosphate dihydrate, sodium aluminum phosphate acidic, ammonium carbonate, ammonium bicarbonate, ammonium carbamate, calcium carbonate, monoammonium phosphate, diammonium phosphate, sodium acid pyrophosphate, aluminum sulfate, sodium aluminum sulfate, acidic potassium tartrate, and glucono delta-lactone. Most preferably, the chemical compound is sodium bicarbonate.

The gas-releasing compound is generally used at a concentration that generates a sufficient amount of gas to yield a product having the desired foam matrix infrastructure and a density in the range of from about 22 lb/ft$^3$ to about 31 lb/ft$^3$. Typically, in forming the foam matrix, the gas-releasing compound is used at a concentration of from about 0.35% to about 2.75% by weight of the fluid, uncured foam.

The compound that reacts with the gas-producing compound is typically an acidulant—i.e., an acid or a salt of an acid. It is generally selected from the group consisting of, for example, citric acid, tartaric acid, ortho-phosphoric acid, and pyrophosphoric acid and their respective calcium, sodium, and potassium salts; fumaric acid; lactic acid; calcium lactate; calcium sulfate; and cream of tartar.

In accordance with the invention, the grain flakes agglomerate as they are coated with the fluid foam binder. The agglomerates range in size, from "small" agglomerates that have from 2 to 25 grain flakes and more typically from 10 to 25 grain flakes to "large" agglomerates that generally have more than 25 grain flakes and, more typically, from 50 to more than 100 grain flakes. The agglomerates preferably have a nonuniform, "cluster-type" appearance. However, in an alternative embodiment, the agglomerates may have a more uniform "cut" or "formed" appearance and shape as desired, such as squares, triangles, ocatagons and hexagons, for example.

In another embodiment of the invention, a method is provided for preparing the fluid foam binder for application onto the flaked grains. The method comprises: (i) mixing at least one sugar with at least one material selected from the group consisting of protein constituents, malt, acidulants, and flavors to form a binder slurry or fluid; (ii) introducing into the binder slurry or fluid at least one gas-releasing compound for reacting with at least one material in the binder slurry, the material being selected from the group consisting of an acid and a salt of an acid; (iii) allowing the at least one gas-releasing compound to react with the at least one material in the binder slurry to result in the evolution of a gas and the formation of a foam. The method optionally includes heating the binder slurry containing the gas-releasing compound at an elevated temperature—for example, from about 100° F. to about 185° F., and preferably from about 120° F. to about 170° F.—to promote formation of the fluid foam binder.

Generally, the gas-releasing compound is used at a concentration that effectively generates a sufficient amount of gas to yield the desired foam matrix infrastructure and, when applied to the grain flakes, a product having the desired density. Typically, the gas-releasing compound is used at a concentration of from about 0.35% to about 2.75% by total wet weight of the coating slurry.

Other ingredients may be incorporated into the foam, including, for example, maltodextrin, corn syrup solids, colorants, and nutrients.

Preferably, the inventive grain product has a moisture content in the range of from about 2.5% to about 8% and more typically from about 4% to about 5% on a dry weight basis.

The following are two specific examples of formulations that may be used in accordance with the invention for preparing the fluid foam. The percentages are expressed by total weight of the fluid foam composition, on a dry weight basis (excluding any water that may be present in the foam composition).

| Ingredient | % |
| --- | --- |
| FORMULATION NO. 1 | |
| sugar | 70.00 |
| flavor | 2.20 |
| malt | 1.30 |
| nonfat dry milk | 10.75 |
| sodium bicarbonate | 2.25 |
| maltodextrin | 13.50 |
| | 100.00% |
| FORMULATION NO. 2 | |
| sugar | 97.65 |
| flavor | 0.20 |
| malt | 0.30 |
| nonfat dry milk | 1.50 |
| sodium bicarbonate | 0.35 |
| | 100.00% |

In accordance with still another aspect of the present invention, a method of making the inventive granola-type product is provided. The method involves: (i) providing a stream of dry ingredients comprising at least one flaked grain which can be selected from the group consisting of oat, wheat, barley, rye, and triticale; (ii) forming a fluid mixture of foam binder materials comprising at least one sugar and at least one material selected from the group consisting of protein constituents, malt, acidulants, and flavors; (iii) introducing at least one gas-releasing compound into the fluid mixture of foam binder materials; (iv) allowing the at least one gas-releasing compound to react with at least one material in the fluid mixture of foam binder materials to form a fluid foam; (v) mixing the fluid foam with flaked grain to form a mass composed of flaked grain bound together by fluid foam; and (vi) curing the mass to form the flaked grain product composed of flaked grain bound together by a solid foam matrix. The finished product typically has a density in the range of from about 22 lb/ft$^3$ to about 31 lb/ft$^3$. Optionally, the fluid mixture of foam binder material and at least one gas-releasing compound can be heated at an elevated temperature—for example, from about 100° F. to 185° F., and preferably from about 120° F. to about 170° F.—to promote formation of the fluid foam. The process of the present invention can be operated as a batch or continuous process.

In an alternative embodiment, a method of making the granola-type product is provided. The method includes: (i) forming a fluid mixture of foam binder materials comprising at least one sugar and at least one material selected from the group consisting of protein constituents, malt, acidulants, and flavors; (ii) mixing the fluid foam binder materials with flaked grain to form a mass composed of flaked grain and the fluid foam binder materials; (iii) forming a fluid foam binder from the foam binder materials; and (iv) curing the fluid foam binder to form a solid foam binder having the flaked grain bound therein in a unitary mass. The flaked grain granola-type product has a density in the range of from about 22 lb/ft$^3$ to about 31 lb/ft$^3$.

In yet another embodiment, a method is provided for making the granola-type product. The method includes mixing flaked grain with a fluid foam or foamable mixture. The mixture of fluid foam and flaked grain is then dried or cured to form the product composed of flaked grain bound in a solid foam matrix. The product has a density in the range of from about 22 lb/ft$^3$ to about 31 lb/ft$^3$.

As described above, the at least one gas-forming compound that is mixed with the binder slurry is typically any compound that, by reaction with at least one material in the binder slurry, results in the evolution of a gas. Preferably, the gas-forming compound is a leavening agent, such as those listed above, and most preferably, it is sodium bicarbonate. The sugars, protein constituents, and material that reacts with the gas-releasing compound are also as described above.

Typically, the coating and drying steps are accomplished by any suitable means and utilize equipment that is well known to those skilled in the art. For example, the coating step may involve spraying the foam with a spray gun in an enrober or rotating drum or directly applying the fluid foam to the grain flakes. The drying step can be achieved by a continuous belt dryer or a fluidized bed, forced air dryer. Because such devices are well known to those skilled in the art, a detailed disclosure of such equipment is not provided.

In accordance with the present invention, the foam matrix is typically applied to the flaked grains at a concentration of from about 27% to about 50% on a dry weight basis of the finished grain product. Preferably, on a dry weight basis, the foam matrix is applied at a concentration of from about 32% to about 38% by weight of the finished grain product.

In an alternative embodiment, the method may further comprise, prior to drying, forming the flaked grain and fluid foam binder mass into a desired shape having a desired thickness and size. In another embodiment, the method may additionally comprise a size-reduction step after the drying step, in which the finished grain product is cut, kibbled or broken into smaller pieces or clusters. The size-reduction step may be done by any suitable means known to those skilled in the art; e.g., the size-reduction step may involve cutting, chipping, or fracturing the dried product into individual pieces. The agglomerates obtained from cutting typically have a more uniform "cut" finish; by contrast, the agglomerates obtained by fracturing the coated flaked grain mass generally a more rough, "natural" and nonuniform appearance. Because devices for conducting the size reduction are well known to those skilled in the art, a detailed disclosure of such equipment is not provided.

Generally, the drying step is done at a temperature in the range of from about 200° F. to about 300° F. and more typically from about 265° F. to about 280° F. Preferably, the grain product is dried to a moisture content of from about 4% to about 5% and more typically from about 2.5% to about 8%.

This method efficiently distributes the foam in a substantially uniform manner over at least a portion of the flaked grain so that the grain flakes become bound in the foam, which can be dried or cured to form a solid foam matrix and does not readily chip or fall off the product. The resulting product is thus ideally suited for bulk packaging since the coating material will not separate into a separate phase or settle to the bottom of a container.

EXAMPLE 1

As described below, the inventive method is suited for making a flaked grain granola-type product having a density in the range of from about 22 lb/ft$^3$ to about 31 lb/ft$^3$.

Shown in FIG. 1, the process commences with feeding a stream 12 of 1 kilogram of oat flakes into a drum rotating at a speed of 9 RPM. The process may be operated on either a batch or continuous process and a coating foam, stream 18, is prepared by introducing 8.95 grams of sodium bicarbonate, stream 14, into a binder slurry, stream 16, comprising 481.93 grams liquid sucrose, 2.24 grams cinnamon, 4.47 grams malt, 23.86 grams salt, and 74.56 grams nonfat dry milk. A fluid foam is formed by allowing the sodium bicarbonate to react so as to generate carbon dioxide. In the method illustrated, coating foam 18 is heated to 140° F. to promote formation of the fluid foam, shown as stream 20. Approximately 596 grams of fluid foam 20' is introduced and mixed with oat flakes 12, and the drum continues to rotate until fluid foam 20' is applied in a substantially uniform manner over the surface of oat flakes 12 and within at least a portion of the interstices of the flakes that bind together as a result of the foam, forming a coated flake mass, shown as stream 22 which is formed into a bed of desired thickness as a unitary mass. Thereafter, the unitary mass can be dried either on a batch or a continuous basis. For example, coated flake mass 22 may be dried at about 270° F. for about 9 minutes, wherein to promote uniform drying, about 50% of the drying time utilizes an upward-directed air flow and about 50% of the drying time utilizes a downward-directed air flow. The resulting solidified mass is composed of flakes bound in a solid foam binder. The dried oat flakes, shown as stream 24, are then cooled to a temperature of less than 100° F. The finished flaked product, stream 26, typically has a moisture content in the range of about 3% to 5%.

EXAMPLE 2

In another example of a product and method in accordance with the invention, the foam matrix is prepared by blending 2.075 kilograms liquid sucrose, 10.4 grams cinnamon, 34.6 grams bran flavor, 20.8 grams dried malt, 207.5 grams nonfat dry milk, and 110.7 grams salt to form a binder slurry. Approximately 41.5 grams sodium bicarbonate are added to the binder slurry to form a coating foam, which is heated to 135° F. to promote the formation of a fluid foam. About 2.06 kilograms of fluid foam is applied to 4.00 kilograms of oat flakes, which can be by spraying, as they tumble in a rotating drum. The tumbling action of oat flakes helps to uniformly distribute the oat flakes in the fluid foam to form a mass of grain flakes and fluid foam. The mass is spread to a depth of about 1 to 1.5 inches and dried at 270° F. for about 9 minutes to cure or dry the fluid foam into a solid binder. Approximately 50% of the drying time utilizes a downward-directed air flow, and the remaining drying time utilizes an upward-directed air flow. The dried oat flakes are cooled to a temperature of less than 100° F. The finished flaked product has a moisture concentration of about 4% to about 5.5%.

While the invention has been described with respect to certain preferred embodiments, it is to be understood that the invention is capable of numerous changes, modifications, and rearrangements without departing from the scope or spirit of the invention as defined in the claims.

We claim:

1. A method of producing a flaked grain granola-type product having a density in the range of from about 22 lb/ft$^3$ to about 31 lb/ft$^3$ comprising:
   (a) forming a fluid mixture of foam binder materials comprising at least one sugar and at least one material selected from the group consisting of protein constituents, malt, acidulants, and flavors;
   (b) introducing at least one gas-releasing compound into the fluid mixture of foam binder materials;
   (c) allowing the at least one gas-releasing compound to react with at least one material in the fluid mixture of foam binder materials to form a fluid foam;
   (d) mixing the fluid foam with flaked grain to form a mass composed of flaked grain bound together by fluid foam; and
   (e) curing the mass to form the flaked grain product composed of flaked grain bound together by a solid foam matrix, said product having a density in the range of from about 22 lb/ft$^3$ to about 31 lb/ft$^3$.

2. The method of claim 1 further comprising forming the mass composed of flaked grain and fluid foam into a desired shape, having a desired thickness and size, prior to curing.

3. The method of claim 1 wherein the product is cured so that the solid foam matrix accounts for from about 27% to about 50% on a dry weight basis of the flaked grain product.

4. The method of claim 1 wherein the at least one gas-releasing compound is selected from the group consisting of ammonium carbonate, ammonium bicarbonate, potassium carbonate, sodium bicarbonate, potassium bicarbonate, aluminum biphosphate, sodium aluminum phosphate, acidic calcium pyrophosphate blends, monocalcium phosphate monohydrate, anhydrous monocalcium phosphate, dicalcium phosphate dihydrate, sodium aluminum phosphate acidic, ammonium carbonate, ammonium bicarbonate, ammonium carbamate, calcium carbonate, monoammonium phosphate, diammonium phosphate, sodium acid pyrophosphate, aluminum sulfate, sodium aluminum sulfate, acidic potassium tartrate, and glucono delta-lactone.

5. The method of claim 1 wherein the at least one gas-releasing compound comprises sodium bicarbonate.

6. The method of claim 5 wherein sodium bicarbonate is present in an amount of from about 0.35% to about 2.75% on a wet weight basis of the fluid foam binder composition.

7. A grain product comprising flaked grains bound in a solid foam binder matrix, said grain product contains no added fat and said binder comprises at least one sugar, at least one flavor, malt, nonfat dry milk and sodium bicarbonate.

8. The grain product of claim 7 wherein the density of said grain product is in the range of from about 22 lb/ft$^3$ to about 31 lb/ft$^3$.

9. The grain product of claim 8 wherein the composition of the binder, on a dry weight basis, comprises at least one sugar in the range of from about 70% to about 97.65%, flavor in the range of from about 0.2% to about 2.2%, malt in the range of from about 0.3% to about 1.25%, nonfat dry milk in the range of from about 1.5% to about 10.6%, and sodium bicarbonate in the range of from about 0.35% to about 2.75%, and maltodextrin in the range of from 0 (zero) % to about 13.2%.

10. A flaked grain product comprising flaked grain bound in a solid foam binder matrix, said grain product having a density in the range of about 22 lb/ft$^3$ to about 31 lb/ft$^3$ and said binder comprising at least one sugar, at least one flavor, malt, nonfat dry milk, and sodium bicarbonate.

11. The product of claim 10 wherein the binder comprises sucrose, flavor, nonfat dry milk, salt, sodium bicarbonate, and maltodextrin.

12. The product of claim 10 wherein the composition of the binder, on a dry weight basis, comprises at least one sugar in the range of from about 70% to about 97.65%, flavor in the range of from about 0.2% to about 2.2%, malt in the range of from about 0.3% to about 1.25%, nonfat dry milk in the range of from about 1.5% to about 10.6%, and sodium bicarbonate in the range of from about 0.35% to about 2.75%, and maltodextrin in the range of from 0 (zero) % to about 13.2%.

13. An intermediate product comprising a liquid foam binder and a plurality of grain flakes disposed therein, said liquid foam binder being suitable for forming a solid foam binder and comprising at least one sugar and at least one material selected from the group consisting of protein constituents, malt, acidulants, and flavors; said liquid foam binder formed by the evolution of a gas formed by reaction of at least one gas-generating compound and said acidulant.

14. The intermediate product of claim 13 wherein said gas-generating compound is sodium bicarbonate.

15. The intermediate product of claim 14 wherein sodium bicarbonate is present on a wet weight basis of the liquid foam of from about 0.35% to about 2.75%.

16. The product of claim 13 wherein the at least one gas-generating compound is selected from the group consisting of ammonium carbonate, ammonium bicarbonate, potassium carbonate, sodium bicarbonate, potassium bicarbonate, aluminum biphosphate, sodium aluminum phosphate, acidic calcium pyrophosphate blends, monocalcium phosphate monohydrate, anhydrous monocalcium phosphate, dicalcium phosphate dihydrate, sodium aluminum phosphate acidic, ammonium carbonate, ammonium bicarbonate, ammonium carbamate, calcium carbonate, monoammonium phosphate, diammonium phosphate, sodium acid pyrophosphate, aluminum sulfate, sodium aluminum sulfate, acidic potassium tartrate, and glucono delta-lactone.

17. The product of claim 16 wherein the at least one compound that reacts with the at least one gas-generating compound is selected from the group consisting of citric acid, tartaric acid, ortho-phosphoric acid, and pyrophosphoric acid and their respective calcium, sodium, and potassium salts; fumaric acid; lactic acid; calcium lactate; calcium sulfate; and cream of tartar.

18. The product of claim 16 wherein the at least one gas-generating compound is used in an amount effective to introduce cells into the solid foam binder so as to produce a chewy, palatable texture in the resulting finished grain product.

19. A grain product comprising flaked grain bound in a solid foam binder matrix, said grain product containing no added fat and said binder composition comprises at least one sugar, sodium bicarbonate and at least one material selected from the group consisting of protein constituents, malt, acidulants and flavors.

20. The grain product of claim 19 wherein the density of said grain product is in the range of from about 22 lb/ft$^3$ to about 31 lb/ft$^3$.

21. The grain product of claim 19 wherein the composition of the binder, on a dry weight basis, comprises at least one sugar in the range of from about 70% to about 97.65%.

* * * * *